United States Patent
Kertesz

(10) Patent No.: US 7,210,709 B2
(45) Date of Patent: May 1, 2007

(54) TUBULAR SOCKET

(75) Inventor: Janos Kertesz, Hofheim (DE)

(73) Assignee: Rasmussen GmbH, Maintal (DE)

( * ) Notice: Subject to any disclaimer, the term of this patent is extended or adjusted under 35 U.S.C. 154(b) by 0 days.

(21) Appl. No.: 10/835,785

(22) Filed: Apr. 30, 2004

(65) Prior Publication Data
US 2004/0239112 A1 Dec. 2, 2004

(30) Foreign Application Priority Data
May 30, 2003 (DE) ................. 103 24 471

(51) Int. Cl.
*F16L 13/02* (2006.01)
(52) U.S. Cl. ............ 285/288.1; 285/423; 285/189
(58) Field of Classification Search .......... 285/293.1, 285/22, 141.1, 21.1, 423, 189, 192, 285.1, 285/288.1
See application file for complete search history.

(56) References Cited

U.S. PATENT DOCUMENTS

| | | | |
|---|---|---|---|
| 5,139,043 A * | 8/1992 | Hyde et al. ............ 137/43 |
| 6,408,867 B2 * | 6/2002 | Aoki et al. ............ 137/202 |
| 6,484,741 B2 * | 11/2002 | Benjey et al. ........ 137/15.26 |
| 6,488,877 B1 * | 12/2002 | Amburgey et al. ...... 264/219 |
| 6,517,116 B1 * | 2/2003 | Cassaro et al. ........ 285/189 |
| 6,540,868 B1 * | 4/2003 | Kertesz .............. 156/304.2 |
| 6,662,820 B2 * | 12/2003 | Dunkle ................ 137/202 |
| 6,679,282 B2 * | 1/2004 | Aoki et al. ............ 137/202 |
| 6,733,048 B2 * | 5/2004 | Kurihara et al. ........ 285/423 |
| 6,755,206 B2 * | 6/2004 | Nishi et al. ............ 137/202 |
| 6,834,771 B2 * | 12/2004 | Suzuki et al. .......... 220/361 |
| 6,840,274 B1 * | 1/2005 | Williamson et al. ..... 137/588 |
| 2003/0178851 A1 * | 9/2003 | Kimisawa et al. ....... 285/423 |

FOREIGN PATENT DOCUMENTS

| | | |
|---|---|---|
| DE | 4239909 | 5/1994 |
| DE | 19535413 C1 * | 10/1996 |
| DE | 19912099 A1 * | 9/2000 |
| EP | 1241039 | 9/2002 |

* cited by examiner

*Primary Examiner*—Aaron Dunwoody
(74) *Attorney, Agent, or Firm*—Friedrich Kueffner

(57) ABSTRACT

A tubular socket for connecting a fluid conduit to a thermoplastic container has first and second thermoplastic parts connected to one another by a multi-component injection molding process. The first part has a smaller creep tendency under pressure load and a smaller swellability relative to hydrocarbon-containing fluids than the second part. The second part is fusion-welded to the container. The second part contains a reinforcement filler that is selected such that the creep tendency and swellability of the second part are approximately the same as that of the first part. A connection strength between the second part and the container is at least as high as that between first and second parts. A thermal shape stability of the second part is at least the same as the thermal shape stability of the container and at most approximately the same as the thermal shape stability of the first part.

19 Claims, 1 Drawing Sheet

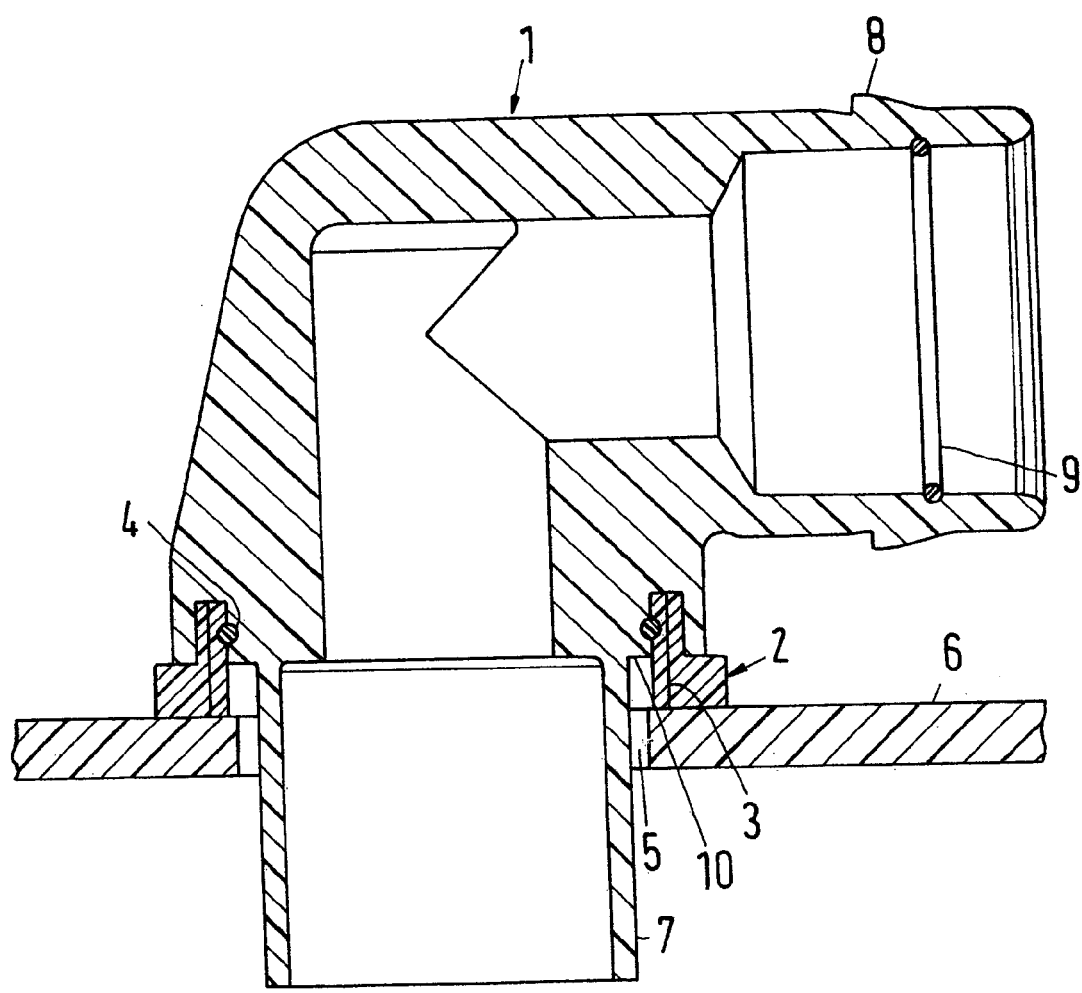

TUBULAR SOCKET

BACKGROUND OF THE INVENTION

1. Field of the Invention

The invention relates to a tubular socket, comprising thermoplastic material, for connecting a fluid conduit to a container, comprising thermoplastic material, wherein the socket has a first part and a second part connected to one another by a two-component injection molding process and wherein the first part has a smaller creep tendency under pressure load and a smaller swellability relative to hydrocarbon-containing fluids than the second part, and wherein the second part and the container are connected by a fusion weld.

2. Description of the Related Art

In a known socket of this kind (DE 42 39 909 C1), the second part is to remain without reinforcement. In practice, it was found however that at higher temperatures, as they occur, for example, in common rail diesel engines within the excess diesel fuel that is returned into the tank by the engine via the socket on the tank, the second part can be thermally deformed when the fluid conduit connected to the socket is simultaneously exposed to greater forces, as they can occur during operation of a motor vehicle. Moreover, the second part that is comprised primarily of high-density polyethylene (HDPE) upon contact with a hydrocarbon-containing fluid, such as gasoline or diesel fuel, can swell more than the material of the first part that is primarily comprised of reinforced polyamide. This can cause cracks within the socket in the vicinity of the connecting location of the two parts. Moreover, HDPE of the second part does not have a sufficiently high diffusion barrier capability relative to hydrocarbon-containing fluids such as gasoline or diesel fuel. On the other hand, it is able to form a fusion-weld connection with the HDPE-containing material of the tank.

SUMMARY OF THE INVENTION

It is an object of the present invention to propose a socket of the aforementioned kind that is better able to withstand thermal and mechanical loads and has a higher diffusion barrier capability.

In accordance with the present invention, this is achieved in that the second part contains a reinforcement filler whose amount and type are selected such that the creep tendency and swellability of the second part are approximately identical to that of the first part, in that a strength of the connection between the second part and the container can be achieved that is at least as high as between the two parts, and in that the thermal shape stability of the second part is at least identical to that of the container and at most approximately the same as that of the first part.

In this solution, the reinforcement filler not only increases the thermal shape stability and mechanical strength of the second part but also the diffusion barrier capability relative to hydrocarbon-containing fluids when appropriately selecting the quantity and type of the reinforcement filler.

Particularly suitable is a reinforcement filler that is selected from the group of synthetic fibers, polyamides (PA), polyethylene terephthalates (PET), polybutylene terephthalates (PBT), polyethylene naphthalates (PEN), polybutylene naphthalates (PBN), polyphenylene sulfides (PPS), aramides, liquid crystal polymers (LCP), glass fibers, glass spheres, minerals, plant fibers, and nano particles, such as nano clay and nano tubes, for example, graphite nano tubes.

The melting temperature of the synthetic fibers should be at least 20° C. higher than that of the plastic material of the second part in order to prevent that the synthetic fibers melt during the injection molding process of the second part.

Also, the diffusion barrier capability of the synthetic fibers should be greater than that of the plastic material of the second part in order to increase the diffusion barrier capability of the second part and thus of the socket.

The thermoplastic material of the first part can be selected from the group of polyamides, polyesters, polyolefins, polyphenylene sulfides (PPS), fluorine-containing thermoplastic materials, and polyacetals.

The second part may contain, as in the past, HDPE as a base material. In addition, the second part and/or the first part can have a diffusion barrier. In this way, the diffusion barrier capability of the socket is further increased.

The first and the second parts as well as the barrier can be formed by a multi-component injection molding process. This type of connection can be realized simply and quickly.

Preferably, the thermoplastic material of the second part is a functional group-containing plastic material. In this way, a stronger connection between the first part and the second part as well as between the plastic material of the second part and the reinforcement filler, inasmuch as it is comprised of plastic material, can be achieved, in particular, when the functional group-containing plastic material of the second part is a polyolefin that is grafted with maleic anhydride.

The invention and its embodiments will be explained in the following by means of the attached drawing of a preferred embodiment of a socket according to the invention.

BRIEF DESCRIPTION OF THE DRAWING

In the drawing, the only FIGURE shows a socket according to the invention comprised of a first part in the form of an angled pipe and a second part in the form of a ring connected to the tank of a motor vehicle by spin welding or hot plate welding.

DESCRIPTION OF THE PREFERRED EMBODIMENTS

The socket comprises a first part 1 in the form of an angled tubular member, a second part 2 in the form of a ring with stepped outer diameter, and a thin cylindrical diffusion barrier 3 provided in the second part 2, as well as an annular seal 4 on the inner side of the second part 2. The socket is connected, by means of spin welding or hot plate welding, with the second part 2 to the rim of an opening 5 of a container 6 that is only partially illustrated and is in the form of a tank of a motor vehicle in the instant embodiment.

The first part 1 comprises a thermoplastic material that is modified with regard to adhesion and has minimal creep tendency relative to pressure load and also comprises a reinforcement filler that additionally reduces the creep tendency. The thermoplastic material of the first part 1 is selected from the group of polyamides, polyesters, polyolefins, polyphenylene sulfides (PPS), fluorine-containing thermoplastic material, and polyacetals. Accordingly, one or several different ones of these materials can be employed. Preferred is however a polyamide, preferably one or several of the polyamides PA6, PA6.6, PA6.4, PA11, and PA12, that exhibit a high diffusion barrier capability relative to hydrocarbon-containing fluids, such as gasoline or diesel fuel, as well as their vapors and have a minimal creep tendency relative to mechanical pressure loads. The creep tendency of the first part 1 is further reduced primarily in that the reinforcement filler of the first part 1 is selected from the group of synthetic fibers, polyamides (PA), polyethylene terephthalates (PET), polybutylene terephthalates (PBT), polyethylene naphthalates (PEN), polybutylene naphthalates (PBN), polyphenylene sulfides (PPS), aramides, liquid crystal polymers (LCP), glass fibers, gas spheres, minerals, plant fibers, and nano particles, such as nano clay and nano tubes, for example, graphite nano tubes.

The second part 2 also contains a reinforcement filler whose quantity and type are selected such that the creep tendency and swellability of the second part 2 is approximately the same as that of the first part 1, in that a strength of the connection between the second part 2 and the container 6 at least as high as that between the second parts 1, 2 can be achieved, and in that the thermal shape stability of the second part 2 is at least identical to that of the container 6 and at most approximately the same as that of the first part 1. The reinforcement filler increases not only the thermal shape stability and mechanical stability of the second part 2 but also its diffusion barrier capability relative to hydrocarbon-containing fluids when appropriately selecting the type and quantity of the reinforcement filler. The reinforcement filler of the second part 2 can be one and/or the other of the filler of the first part 1. Inasmuch as synthetic fibers are concerned, they have a melting temperature that is at least 20° C. higher than that of the plastic material of the second part 2 and have a diffusion barrier capability higher than that of the plastic material of the second part 2.

The thermoplastic material of the second part 2 is HDPE. It can also contain functional groups. This results in an even stronger connection between the first part 1 and the second part 2 as well as between the plastic material of the second part 2 and its reinforcement filler, inasmuch as the latter is comprised of plastic material, in particular, when the plastic material of the second part 2 containing functional groups is a polyolefin that is grafted with maleic anhydride.

Because of the barrier 3 in the second part 2 the diffusion barrier capability of the second part 2 is further increased and thus also that of the entire socket. Such a barrier can also be provided in the first part 1 or only in the first part 1.

The two parts 1 and 2 as well as the barrier 3 are produced by a multi-component injection molding method wherein first the barrier 3 is injection molded in a mold tool; subsequently, after hardening or solidifying of the barrier 3, the second part 2 is injection molded in a mold tool and simultaneously injection-molded about the barrier 3. After insertion of the sealing ring 4 into an inner annular groove of the second part 2, the first part 1 is injection-molded in a mold tool and is simultaneously injection-molded about the thin wall section of the second part 2 and the sealing ring 4.

However, it is also possible, after injection molding of the second part 2, to injection mold the barrier 3 into the core of the second part 2 that is still plastically deformable, and, subsequently, to injection-mold the material of the first part 1 about the hardened or solidified second part 2 and the sealing ring 4 in a mold tool. In this type of a multi-component injection molding method, at the boundaries between the second part 2 and the barrier 3 minimal undulations result that act, on the one hand, as a labyrinth seal and, on the other hand, provide an additional positive engagement.

The first part 1 has a projection 7 projecting through the opening 5 into the container 6 and further has on the outwardly extending end section a peripheral securing rib 8 as well as within this end section a sealing ring 9 inserted into an annular groove. Into this end section, a coupling member, that is tightly connected to one end of a fluid conduit to be connected to the container 6, is inserted that engages the securing rib 8 by means of hooks provided at the ends of elastic securing arms.

The container 6 is comprised, at least on its outer side, of HDPE that, when welding the socket to the container 6, forms a fusion-weld connection with the thermoplastic material of the second part 2.

Between the projection 7 and the second part 2 an annular groove 10 is provided into which, during welding of the socket to the container 6, excess molten material of the second part 2 can flow.

While specific embodiments of the invention have been shown and described in detail to illustrate the inventive principles, it will be understood that the invention may be embodied otherwise without departing from such principles.

What is claimed is:

1. A tubular socket for connecting a fluid conduit to a container, comprising thermoplastic material, the tubular socket comprising:
   a first part comprising a thermoplastic material;
   a second part comprising a thermoplastic material, wherein the first part and the second part are connected to one another by a multi-component injection molding process;
   wherein the first part has a smaller creep tendency under pressure load than the second part and a smaller swellability relative to hydrocarbon-containing fluids than the second part;
   wherein the second part is configured to form a fusion-weld connection with the container;
   wherein the second part contains a reinforcement filler;
   wherein a quantity and a type of the reinforcement filler is selected such that a creep tendency of the second part approaches a creep tendency of the first part and a swellability of the second part approaches a swellability of the first part, wherein the reinforcement filler includes nano particles;
   wherein the strength of a connection between the second part and the container is at least as high as a strength of a connection between the first and second parts; and
   wherein a thermal shape stability of the second part is at least the same as a thermal shape stability of the container and at most approximately the same as a thermal shape stability of the first part, wherein the nano particles are nano clay or nano tubes.

2. The socket according to claim 1, wherein the reinforcement filler additionally includes filler material selected from the group consisting of synthetic fibers, polyamides (PA), polyethylene terephthalates (PET), polybutylene terephthalates (PBT), polyethylene naphthalates (PEN), polybutylene naphthalates (PBN), polyphenylene sulfides (PPS), aramides, liquid crystal polymers (LCP), glass fibers, glass spheres, minerals, and plant fibers.

3. The socket according to claim 2, wherein a melting temperature of the synthetic fibers is at least 20° C. higher than a melting temperature of the thermoplastic material of the second part.

4. The socket according to claim 2, wherein a diffusion barrier capability of the synthetic fibers is greater than a diffusion barrier capability of the thermoplastic material of the second part.

5. The socket according to claim 1, wherein the nano tubes are graphite nano tubes.

6. The socket according to claim 1, wherein the thermoplastic material of the first part is selected from the group consisting of polyamides, polyesters, polyolefins, polyphenylene sulfides (PPS), fluorine-containing thermoplastic materials, and polyacetals.

7. The socket according to claim 1, wherein at least one of the second part and the first part has a diffusion barrier.

8. The socket according to claim 7, wherein the first and second parts and the diffusion barrier are formed by a multi-component injection molding process.

9. The socket according to claim 1, wherein the thermoplastic material of the second part is a functional group-containing plastic material.

10. The socket according to claim 9, wherein the functional group-containing plastic material is a polyolefin grafted with maleic anhydride.

11. A tubular socket for connecting a fluid conduit to a container, comprising thermoplastic material, the tubular socket comprising:
a first part comprising a thermoplastic material;
a second part comprising a thermoplastic material, wherein the first part and the second part are connected to one another by a multi-component injection molding process;
wherein the first part has a smaller creep tendency under pressure load than the second part and a smaller swellability relative to hydrocarbon-containing fluids than the second part;
wherein the second part is configured to form a fusion-weld connection with the container;
wherein the second part contains a reinforcement filler;
wherein a quantity and a type of the reinforcement filler is selected such that a creep tendency of the second part approaches a creep tendency of the first part and a swellability of the second part approaches a swellability of the first part, wherein the reinforcement filler includes synthetic fibers;
wherein the strength of a connection between the second part and the container is at least as high as a strength of a connection between the first and second parts;
wherein a thermal shape stability of the second part is at least the same as a thermal shape stability of the container and at most approximately the same as a thermal shape stability of the first part; and
wherein a diffusion barrier capability of the synthetic fibers is greater than a diffusion barrier capability of the thermoplastic material of the second part.

12. The socket according to claim 11, wherein the thermoplastic material of the second part is a functional group-containing plastic material.

13. The socket according to claim 12, wherein the functional group-containing plastic material is a polyolefin grafted with maleic anhydride.

14. The socket according to claim 11, wherein the thermoplastic material of the first part is selected from the group consisting of polyamides, polyesters, polyolefins, polyphenylene sulfides (PPS), fluorine-containing thermoplastic materials, and polyacetals.

15. A tubular socket for connecting a fluid conduit to a container, comprising thermoplastic material, the tubular socket comprising:
a first part comprising a thermoplastic material;
a second part comprising a thermoplastic material, wherein the first part and the second part are connected to one another by a multi-component injection molding process;
wherein the first part has a smaller creep tendency under pressure load than the second part and a smaller swellability relative to hydrocarbon-containing fluids than the second part;
wherein the second part is configured to form a fusion-weld connection with the container;
wherein the second part contains a reinforcement filler;
wherein a quantity and a type of the reinforcement filler is selected such that a creep tendency of the second part approaches a creep tendency of the first part and a swellability of the second part approaches a swellability of the first part;
wherein the strength of a connection between the second part and the container is at least as high as a strength of a connection between the first and second parts;
wherein a thermal shape stability of the second part is at least the same as a thermal shape stability of the container and at most approximately the same as a thermal shape stability of the first part; and
wherein at least one of the second part and the first part has a diffusion barrier.

16. The socket according to claim 15, wherein the first and second parts and the diffusion barrier are formed by a multi-component injection molding process.

17. The socket according to claim 15, wherein the thermoplastic material of the second part is a functional group-containing plastic material.

18. The socket according to claim 17, wherein the functional group-containing plastic material is a polyolefin grafted with maleic anhydride.

19. The socket according to claim 15, wherein the thermoplastic material of the first part is selected from the group consisting of polyamides, polyesters, polyolefins, polyphenylene sulfides (PPS), fluorine-containing thermoplastic materials, and polyacetals.

* * * * *